United States Patent [19]

Sasaki et al.

[11] Patent Number: 5,289,367
[45] Date of Patent: Feb. 22, 1994

[54] NUMERICAL CONTROL APPARATUS USING FUZZY CONTROL

[75] Inventors: Takao Sasaki, Hachioji; Kentaro Fujibayashi, Musashino; Takashi Endo, Kariya, all of Japan

[73] Assignee: Fanuc Ltd., Minamitsuru, Japan

[21] Appl. No.: 651,380

[22] PCT Filed: Jul. 12, 1990

[86] PCT No.: PCT/JP90/00902
§ 371 Date: Feb. 27, 1991
§ 102(e) Date: Feb. 27, 1991

[87] PCT Pub. No.: WO91/01518
PCT Pub. Date: Feb. 7, 1991

[30] Foreign Application Priority Data

Jul. 21, 1989 [JP] Japan .................. 1-190177

[51] Int. Cl.⁵ .................. G05B 13/02; G06F 15/00
[52] U.S. Cl. .................. 364/152; 318/561;
364/174; 364/474.12; 364/474.15; 395/61;
395/900; 395/904
[58] Field of Search .......... 364/148, 152, 153, 474.15,
364/174, 474.12; 318/561, 615–618, 571;
395/61, 900, 909, 912

[56] References Cited

U.S. PATENT DOCUMENTS

| 3,634,664 | 1/1972 | Valek | 364/153 X |
| 4,237,408 | 12/1980 | Frecka | 364/474.15 X |
| 5,012,430 | 4/1991 | Sakurai | 395/900 X |
| 5,025,499 | 6/1991 | Inoue et al. | 395/900 X |

OTHER PUBLICATIONS

Li et al–"Developement of Fuzzy Algorithms for Servo Systems"–IEEE Control Systems Magazine–Apr. 1989; pp. 65–71.
Sakai et al–"A Fuzzy Controller in Turning Process Automation"–Industrial Applications of Fuzzy Control–M. Sugeno (ED.)–Elsevier Science Publishers B.V. (North Holland), 1985.

*Primary Examiner*—Joseph Ruggiero
*Attorney, Agent, or Firm*—Staas & Halsey

[57] ABSTRACT

A numerical control apparatus for adaptively controlling a servo apparatus, wherein a load current (Ln) and a velocity (Vn) of a spindle motor (74) are used as a fuzzy input. In response to the fuzzy input, a fuzzy control means (80) effects a fuzzy inference to output a velocity control signal (Cng) for controlling the velocity of the spindle motor (74). This control of the velocity of the spindle motor (74) with the velocity control signal (Cng) makes it possible to effect a smooth velocity control.

7 Claims, 5 Drawing Sheets

R1 : if Vn is Big(A11) and Ln is Big(A12) then Cn is BigMinus (B1)

R2 : if Vn is Medium(A21) and Ln is Big(A22) then Cn is MediumMinus(B2)

R3 : if Vn is Small(A31) and Ln is Big(A32) then Cn is SmallMinus (B3)

R4 : if Vn is Medium(A41) and Ln is Small(A42) then Cn is BigPlus(B4)

R5 : if Vn is Big(A51) and Ln is Small(A52) then Cn is SmallPlus(B5)

F I G. 2

NUMERICAL CONTROL APPARATUS USING FUZZY CONTROL

DESCRIPTION

1. Technical Field

The present invention relates to a numerical control apparatus for adaptively controlling a servo apparatus such as a spindle motor, and more particularly, to a numerical control apparatus having a fuzzy control means.

2. Background Art

As a system for adaptively controlling a servo apparatus such as a spindle motor, for example, a system is known that utilizes a programmable machine controller (hereinafter, referred to as simply "a PMC", when applicable) which is substantially a self-contained PC (programmable controller) built into a numerical control apparatus.

FIG. 5 explains a system for adaptively controlling a spindle motor. In FIG. 5, the axis of abscissa represents a time and the axis of ordinate represents a load current in a spindle motor. During the time interval Ta in which a load current curve Is is higher than the upper limit Lu, the PMC lowers a spindle override and reduces the rotational speed (velocity) of the spindle motor. In the time interval Tb in which the load current Is is below the lower limit Ls, the PMC raises the override for the spindle motor to increase the velocity thereof. Thus, the PMC effects the adaptive control in such a way that the load current in the spindle motor is set to the reference value Lr, i.e., a constant load is obtained.

In the case of such an adaptive control using a PMC, however, a uniqueness control is performed in such a way that the load current is simply compared with the threshold limit values, and therefore, the override is frequently changed. As a result, a problem arises in that undesirable effects such as an unsatisfactory surface roughness, for example, may be caused by the adaptive control in some cases.

DISCLOSURE OF THE INVENTION

The present invention has been contrived in consideration of these circumstances, and an object thereof is to provide a numerical control apparatus in which a velocity of a spindle motor is smoothly controlled by a fuzzy control means.

To solve the above problem, according to the present invention, there is provided a numerical control apparatus for adaptively controlling a servo apparatus, characterized by comprising a fuzzy control means for effecting a fuzzy inference by receiving data of a load current and a velocity of the servo apparatus as a fuzzy input and outputting a velocity control signal for controlling the velocity of the servo apparatus.

The fuzzy control means receives the data of the load current and velocity of a servo apparatus such as a spindle motor, as an input, and then subjects the input to a fuzzy inference, to thereby produce a velocity control signal for controlling the velocity of the servo apparatus. The control of the servo apparatus with the resulting velocity control signal makes it possible to effect a smooth velocity control for the servo apparatus.

BRIEF DESCRIPTION OF THE DRAWINGS

FIG. 2 illustrates an example of fuzzy rules;

BEST MODE OF CARRYING OUT THE INVENTION

One embodiment of the present invention will now be described with reference to the accompanying drawings.

Figure 1:
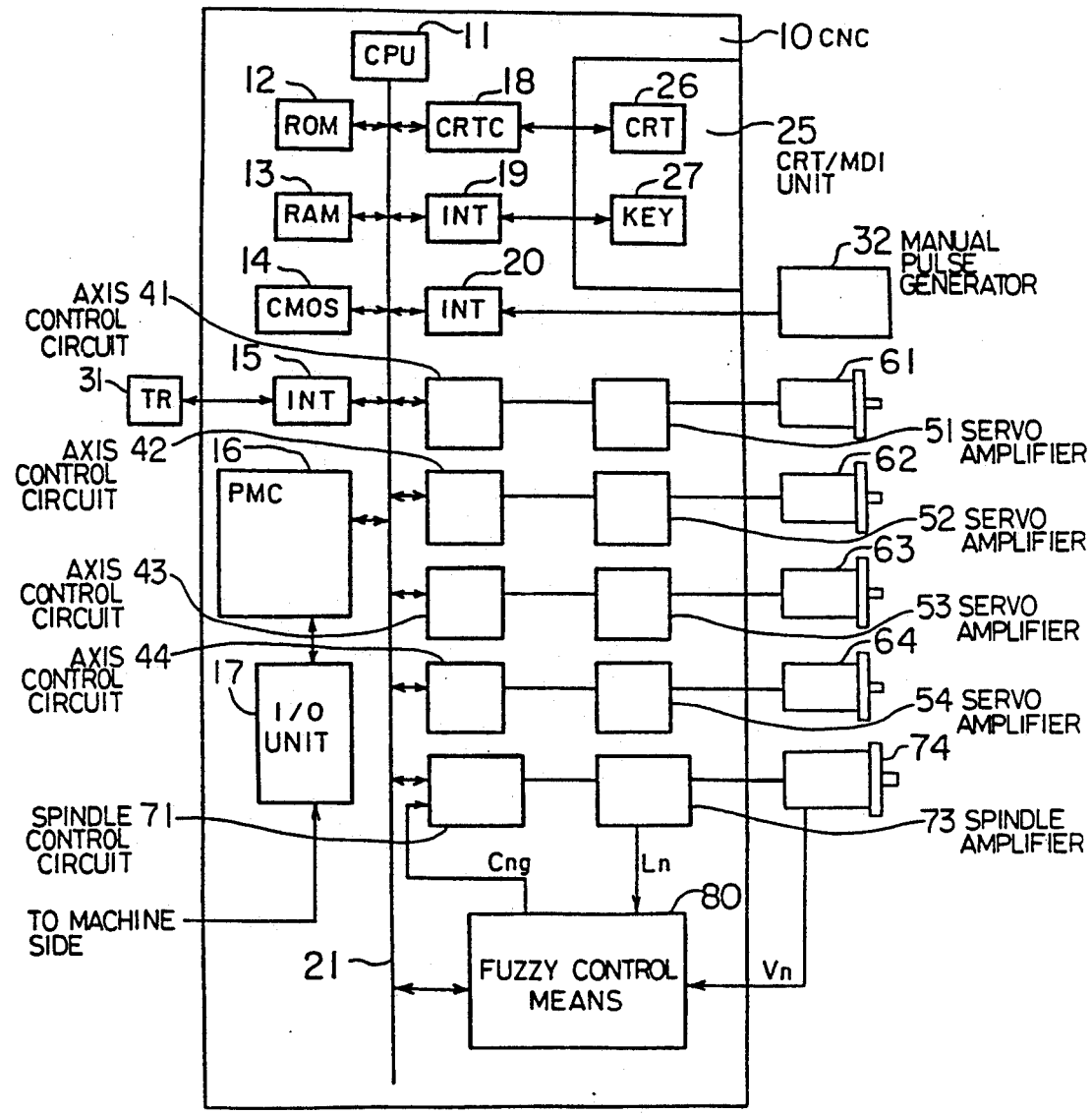
FIG. 1 is a block diagram showing hardware of a computerized numerical control apparatus for carrying out the present invention.

FIG. 1 is a block diagram showing hardware of a computerized numerical control apparatus for carrying out the present invention. In FIG. 1, reference numeral 10 designates a computerized numerical control apparatus (hereinafter, referred to as simply "a CNC", when applicable), and a processor 11 serves as a central processor for the whole CNC. Namely, the processor 11 reads out a system program stored in a ROM 12 via a bus and executes the control for the whole CNC in accordance with the thus read out system program. Calculation data, display data and the like are temporarily stored in a RAM 13, which is a DRAM. A correction amount for tool movement, a correction amount for pitch error, a machining program, parameters and the like are stored in a CMOS 14. Batteries (not shown) are used as a backup for the CMOS 14 so that, even if a power supply for the CNC 10 is turned off, data stored in the CMOS will be held as is, since the CMOS is constituted by a nonvolatile memory.

An interface 15 is an interface for an external apparatus to which an external apparatus 31 such as a paper tape reader, a paper tape puncher, and a paper tape reader/puncher is connected. The machining program is read out from the paper tape reader, and a machining program is edited by the CNC 10 and output to the paper tape puncher.

The CNC 10 incorporates therein a programmable machine controller (hereinafter, referred to as simply "a PMC", when applicable) 16 which controls the machine side through a sequence program produced in the form of a Ladder. More specifically, the PMC 16 converts M, S and T functions assigned by the machining program into a signal required for the machine side, through the sequence program, and then outputs the resulting signal to the machine side through an I/0 unit 17. This output signal is used to actuate a hydraulic valve, a pneumatic valve, an electric actuator and the like, by driving a magnet and the like provided in the machine side. In addition, the PMC 16 receives a signal from a limit switch in the machine side, a switch on a machine operation panel, or the like through the I/O unit, processes the input signal as necessary, and then outputs the resulting signal to the processor 11.

A graphic control unit 18 converts digital data such as the current positions of the respective axes, alarm data, parameter data, picture data or the like into a picture signal and outputs same. The resulting picture signal is transferred to a display unit 26 in a CRT/MDI unit 25 and displayed as an image corresponding thereto. An interface 19 receives data from a keyboard 27 in the CRT/MDI unit 25 and inputs the data to the processor 11.

An interface 20 is connected to a manual pulse generator 32 and receives a pulse signal from the manual pulse generator 32. The manual pulse generator 32 is mounted in the machine operation panel and is used to accurately move a machine operating portion by a manual operation.

Axis control circuits 41 through 44 receive the movement commands for the respective axes output by the processor 11, and output these movement commands for the respective axes to servo amplifiers 51 through 54, respectively, and in response to those movement commands for the axes, the servo amplifiers 51 through 54 drive servomotors 61 through 64 for the axes, respectively. The servomotors 61 through 64 contain respective pulse coders for position detection, from which position signals are fed back in the form of a pulse train. A linear scale is often used as a position detector. Moreover, a velocity signal can be produced by subjecting the pulse train to an F/V (Frequency/Velocity) conversion, and further, a tachometer generator may be used for velocity detection if preferable. In FIG. 1, feedback lines for the position signals and a feedback line for the velocity signal are omitted, for brevity.

A spindle control circuit 71 outputs a spindle velocity signal to a spindle amplifier 73, after receiving commands such as a spindle rotation command and a spindle orientation command, and in response to the spindle velocity signal, the spindle amplifier 73 causes a spindle motor 74 to rotate at the commanded rotational speed.

A fuzzy control means 80 receives a load current Ln in the spindle motor 74 and a velocity signal Vn from the spindle amplifier 73 and a tachometer generator (not shown) built into the spindle motor 74, respectively. The fuzzy control means 80 then effects a fuzzy inference, using both the load current Ln and the velocity signal Vn, to output an override control signal Cng for controlling an override for the spindle motor. The spindle control circuit 71 adds the override control signal Cng to a spindle velocity signal from the processor 11, to output an instruction, with an actual commanded velocity for the spindle motor, to the spindle amplifier 73.

Alternatively, the override control signal Cng is first sent to the PMC 16, and then output therefrom as an override signal to the spindle control circuit 71.

The fuzzy control means 80 may be constituted either by a special fuzzy controller arranged in the CNC 10, or in the form of software incorporated in the system program for the CNC stored in the ROM 12. For such a selection, where a more accurate fuzzy control should be effected, the provision of the special fuzzy controller becomes an advantage, but where such an accurate fuzzy control is not necessary, it is preferable to incorporate the software for the fuzzy control in the system program, from a cost viewpoint.

FIG. 2 illustrates an example of fuzzy rules. In this case, five rules, R1 through R5, are provided.

The first rule R1 implies that, if the velocity Vn of the spindle motor 74 is Big and the load current Ln is Big, then the level of the override control signal Cn is Big Minus. The reference symbols A11, A12, and B1 in parentheses correspond respectively to membership functions which will be described later.

The second rule R2 implies that, if the velocity Vn is Medium and the load current Ln is Big, then the level of the override control signal Cng is Medium Minus.

The third rule R3 implies that, if the velocity Vn is Small and the load current Ln is Big, then the level of the override control signal Cng is Small Minus.

The fourth rule R4 implies that, if the velocity Vn is Medium and the load current Ln is Small, then the level of the override control signal Cng is Big Plus.

Finally, the fifth rule R5 implies that, if the velocity Vn is Big and the load current Ln is Small, then the level of the override control signal Cng is Small Plus.

Figure 3A:
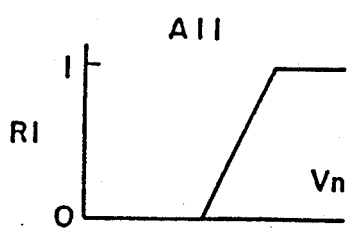
FIGS. 3A-3O illustrate membership functions corresponding to the fuzzy rules illustrated in FIG. 2.
Figure 3B:
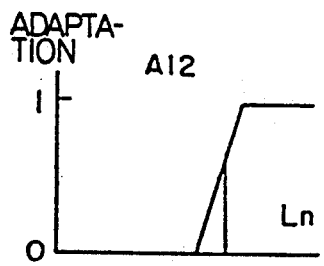
Figure 3C:
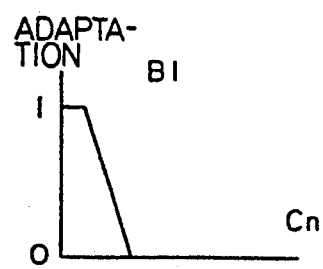
Figure 3D:
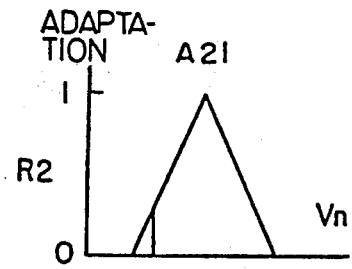
Figure 3E:
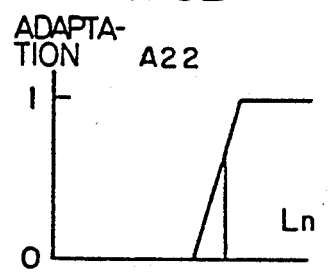
Figure 3F:
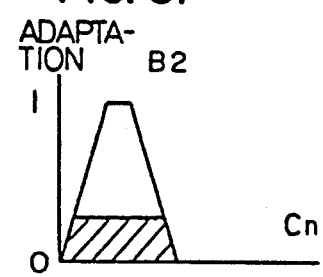
Figure 3G:
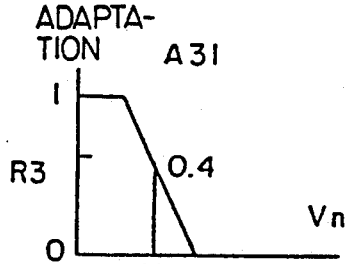
Figure 3H:
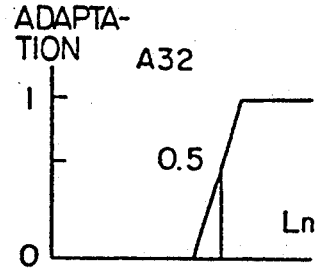
Figure 3I:
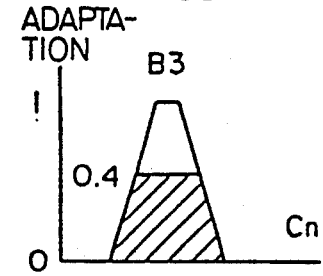
Figure 3J:
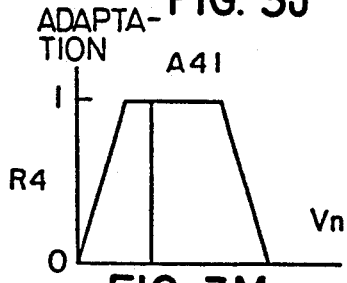
Figure 3K:
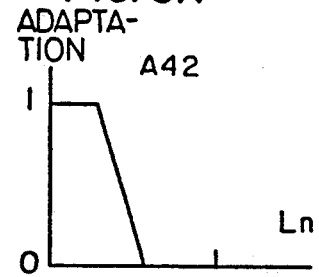
Figure 3L:
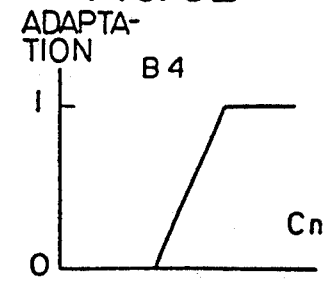
Figure 3M:
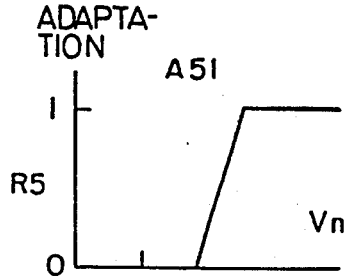
Figure 3N:
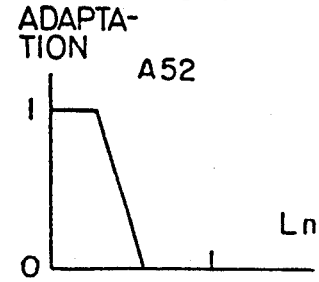
Figure 3O:
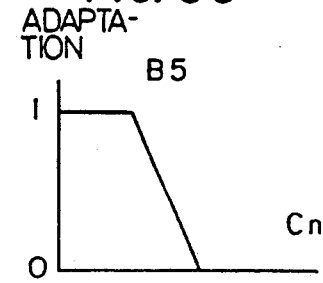

FIGS. 3A–3O illustrate membership functions corresponding to the above fuzzy rules. For the membership functions A11, A21, A31, A41 and A51, the axis of abscissa of each membership function represents the velocity Vn of the spindle motor 74, and the axis of ordinate thereof represents the adaptation of each inference.

For the membership functions A12, A22, A32, A42 and A52, the axis of abscissa of each membership function represents the load current Ln in the spindle motor 74, and the axis of ordinate thereof represents the adaptation.

For the membership functions B1, B2, B3, B4 and B5, the axis of abscissa represents the override control signal Cng, and the axis of ordinate thereof represents the adaptation.

Thus, the fuzzy inference is effected in accordance with each of the fuzzy rules illustrated in FIG. 2 and each of the membership functions illustrated in FIGS. 3A–3O, using the velocity Vn and the load current Ln of the spindle motor 74 as an input, to thereby obtain each of the membership functions B1 through B5 corresponding to the desired override control signal Cng.

In the present embodiment, the prerequisite of each of the fuzzy rules R1 through R5 is constructed in the form of a logical product (AND). Here, the first rule R1 will be taken as an example, to obtain the membership function B3. Assuming that the adaptation corresponding to the velocity Va in the membership function A31 is 0.4, and the adaptation corresponding to the load current La in the membership function A32 is 0.5, the adaptation has a low value of 0.4 in the membership function B3. In this case, the lower half (indicated by the oblique lines) obtained by cutting the original membership function B3 at the level of 0.4 represents the desired membership function B3. Thus, the desired membership functions B1 through B5 respectively corresponding to the fuzzy rules R1 through R5 are obtained. In the present embodiment, the values of the membership functions B1, B4 and B5 are zero.

Figure 4:
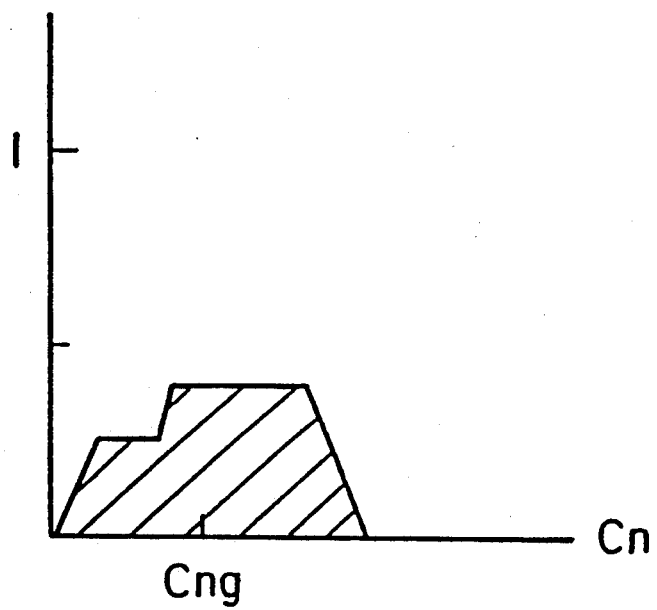
FIG. 4 is a graphical representation showing a sum of membership functions B1 through B5.
Figure 5:
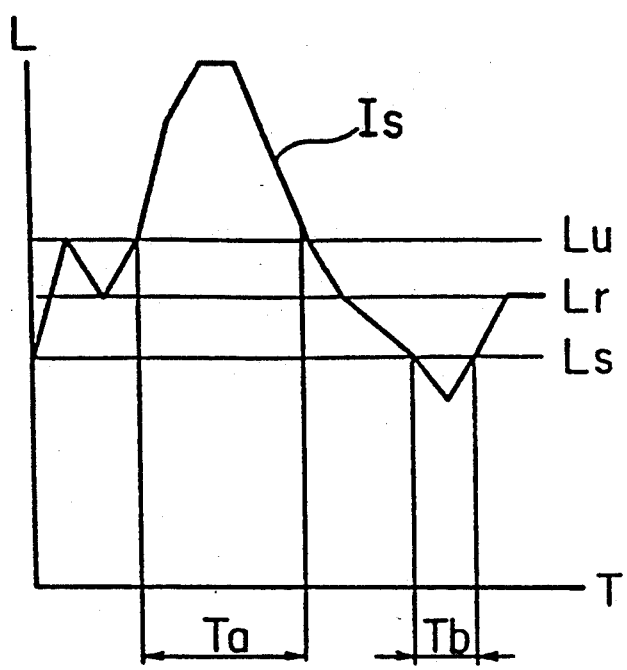
FIG. 5 is a graphical representation explaining an adaptive control for a spindle motor.

Subsequently, a sum of the resulting membership functions B1 through B5 is obtained. In this connection, the sum is obtained by taking the largest value among the resulting membership functions at each interval on the axis of abscissa. FIG. 4 is a graphical representation showing the sum of the membership functions B1 through B5, i.e., the composite membership function. The center of gravity Cng of the composite membership function shown in FIG. 4 is obtained, and the thus-obtained Cng is used as the desired override control signal, whereby the override control for the spindle motor 74 can be smoothly effected. Alternatively, a central value of the sum of the membership functions B1 through B5 may be used as the override control signal.

Note, although the description has been given with respect to a specific case wherein the velocity of the spindle motor as the servo apparatus is controlled, the velocity of the servomotor can be controlled in the same way.

Further, a method may be employed such that the fuzzy rules and membership functions are previously converted into an inference data base ready to be executed, and the fuzzy inference is carried out using the inference data base.

Furthermore, the inference data base may be arranged in such a way that a plurality of data bases are stored and selectively read out in accordance with a workpiece.

According to the present invention, as described above, the fuzzy control means is incorporated in the numerical control apparatus to subject the velocity of the servo apparatus such as a spindle motor to a fuzzy control, and accordingly, a smooth velocity control can be effected, which allows a smoothly processed surface of a workpiece to be obtained with an increased processing speed.

Further, since the fuzzy rules and the membership functions are prepared in the form of an inference data base, and a plurality of inference data bases are provided, a user can effect an optimum fuzzy control by selecting the inference data base and the like in accordance with a workpiece.

We claim:

1. A numerical control apparatus for adaptively controlling a servo apparatus, comprising:

input means for receiving fuzzy input including data of a load current and a velocity of the servo apparatus; and fuzzy control means for effecting a fuzzy interference using predetermined membership functions of the load current and velocity by receiving the fuzzy input and outputting a velocity control signal as an override control signal for controlling the velocity of the servo apparatus.

2. A numerical control apparatus according to claim 1, wherein the servo apparatus is a spindle motor.

3. A numerical control apparatus according to claim 1, wherein the servo apparatus is a servomotor.

4. A numerical control apparatus according to claim 1, wherein fuzzy rules and the membership functions incorporated in the fuzzy control means are previously converted into an inference data base to be executed, and the fuzzy inference is effected using the inference data base.

5. A numerical control apparatus according to claim 1, wherein a plurality of inference data bases are prepared and electively read out in accordance with a workpiece.

6. A numerical control apparatus according to claim 1, wherein the fuzzy control means comprises an independent fuzzy controller arranged in the apparatus body.

7. A numerical control apparatus according to claim 1, wherein the fuzzy control means comprises control softward which is processed by the apparatus body.

* * * * *